United States Patent

[11] 3,582,000

[72] Inventors Johannes Werkmeister
 Reichenbach Fils;
 Holger Scheler, Faurndau, Germany
[21] Appl. No. 820,354
[22] Filed Apr. 30, 1969
[45] Patented June 1, 1971
[73] Assignee Firma Hermann Traub
 Reichenbach (Fils), Germany
[32] Priority Feb. 8, 1969
[33] Germany
[31] P 19 06 423.4

[54] WORKPIECE FEEDING DEVICE
 10 Claims, 10 Drawing Figs.
[52] U.S. Cl. .................................................... 214/1.1,
 82/2.7
[51] Int. Cl. ................................................... B23q 5/22
[50] Field of Search .......................................... 214/1.1-
 —1.5; 82/20, 102, 2.7

[56] References Cited
UNITED STATES PATENTS
3,360,139 12/1967 Bechler ........................ 214/1.2

Primary Examiner—Gerald M. Forlenza
Assistant Examiner—Frank E. Werner
Attorney—Werner W. Kleeman ABSTRACT: A device for feeding workpieces for machine tools including a feed member and clamp for holding the workpiece and feeding it to the machine tool by displacement of the feed member and also including a movable carrier having two jaws for gripping the workpiece. A first driving means is provided for moving the carrier such that the jaws may be placed in, or out of, the path of displacement of the feed member and a second driving means is provided for opening and closing the jaws.

Fig. 2

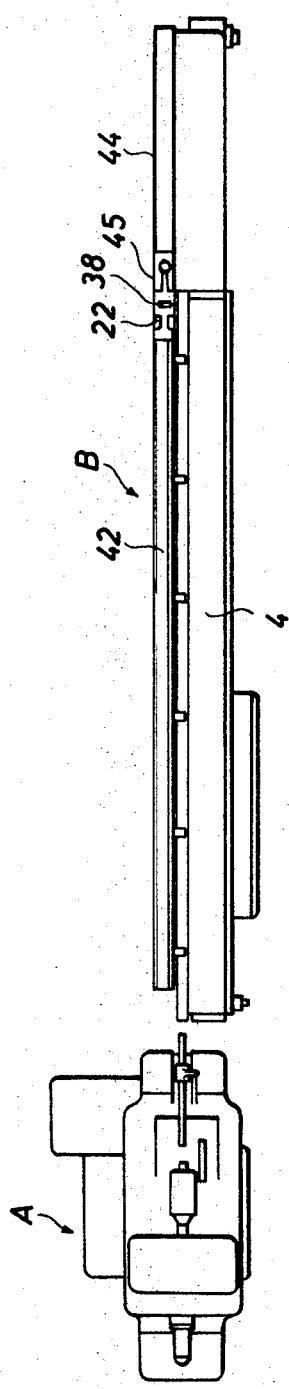
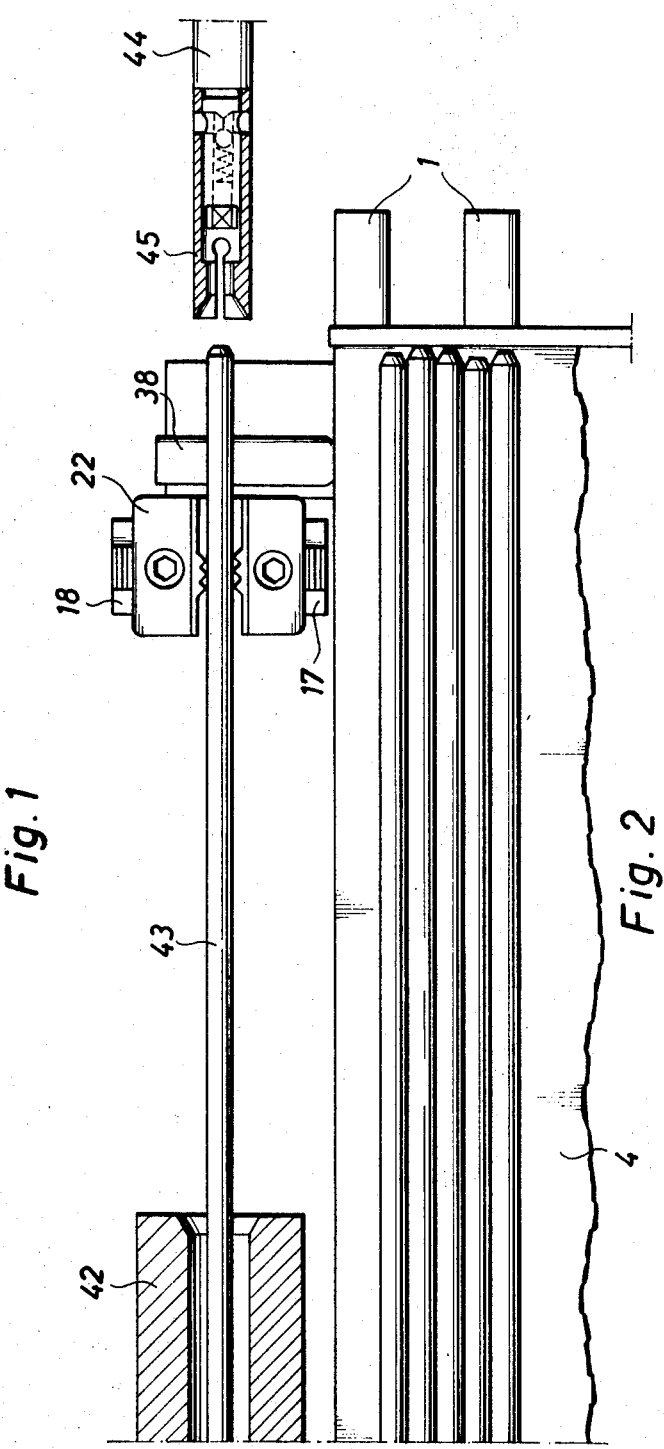
Fig. 1
Fig. 2

WORKPIECE FEEDING DEVICE

The invention concerns a device, for feeding workpieces, particularly in the shape of bars or rods, into machine tools, particularly automatic lathes, and comprises a feed member having a feed clamp to grip the rear end of the workpiece, and a gripping device to grip a workpiece located in the feed clamp. From the expression workpiece there is to be understood a workpiece bar or rod and also a workpiece produced therefrom or a remainder of the bar or rod.

A known device has a stationary gripping device and an operating device with a control shaft. Three cams are mounted nonrotatably on this and cooperate with transmission members, the cams being so designed that in the course of a complete revolution of the control shaft, the first of the three cams causes the firm clamping of the gripping device on the piece remaining in the feed member, the second cam brings a lever connected to the transmission members into operative connection with the feed members and the third cam withdraws the feed member by means of this lever in order to remove its clamp from the firmly held piece. The curve causes the unclamping of the gripping device from the piece which was in the feed member and thereafter its renewed clamping on a newly inserted rod- or bar-shaped workpiece. The third cam displaces the feed member in order to apply its clamp to the rear end of the bar-shaped workpiece. Finally the second cam separates the lever from the feed member and the first cam releases the gripping device from the bar-shaped workpiece. As the gripping device is in the path travelled by the feed member and the bar-shaped workpiece, its aperture must be large enough for the feed member to pass therethrough. By this a large closure path for the clamp results which prevents the use of a driving member with a short stroke, for example an electromagnet. Furthermore the danger exists that a machined piece remains in the clamp, if for example, it is gripped unfavorably, and does not fall out of the clamp under gravity. No workpieces can be put down at a predetermined place, at a distance from the guide path of the workpieces, by means of this device.

The object of the invention is to provide a device, for feeding bar-shaped workpieces into machine tools, in which the gripping device for clamping the rod-shaped workpiece, only has to travel a short distance. This object is achieved, in that the gripping device is mounted on a movable gripper carrier which serves to move the jaws of the gripper into or out of the displacement track of the feed member by means of a driving device arranged on the under carriage, which has a longitudinally displaceable driving member. The gripping device can thus be brought out of the displacement track of the rod-shaped workpiece and of the feed member. For this reason the jaws of the gripper only need to travel the path that is necessary to grip or release the bar-shaped workpiece or the machined piece.

The path to be travelled by the gripping jaws is thus very short and due to the short movements, a rapid operation results. The use of a high gear between the driving device, and the jaws of the gripper is also possible in order to obtain the necessary gripping power. Relatively small solenoids can be used only requiring small currents. Due to this a unitary source of energy may be used. Thus only slight outlay is necessary for the electric installation and the device controlling the solenoid. The constructional parts used can be produced simply, and also save material and space. The employment of a driving device having a longitudinally displaceable driving member, particularly a solenoid, saves the arrangement of an awkward, expensive and space wasting gear, which requires pushrods and transmission members. The gripping device carries out a discharge movement and thus facilitates the falling out of the workpiece or of the machined piece. The movement of the gripping device can be utilized in order to discharge the machined piece or the workpiece at a predetermined position, at a distance from the place of reception. The arrangement of control of the workpieces or taking up of the machined piece for further working thereof, is possible by means of a switch arrangement. Inasmuch as the gripping device hits hard against a stop, the workpiece or the machined piece allows itself to be thrown out of the device due to the inherent potential energy. Furthermore the gripping device, on introduction of the rod-shaped workpieces into the device, lies outside the reception area, and therefore does not have to be opened widely for the reception of these workpieces as in the known device. The gripping device according to the invention also forms a constructional unit which can be mounted subsequently.

An improvement of the invention consists in that the gripper support is designed as a carriage which can be raised and lowered.

If an operating bar, carrying a spreader wedge displaceably mounted on the carriage of the gripping device, is to be operated by a driving device, likewise mounted on the under carriage, that has a longitudinally displaceable driving member, then the driving device does not need to be secured on the carriage itself and therefore is not raised and lowered with it. Thus a saving of energy in raising and lowering the carriage is obtained.

In another preferred embodiment the movable gripper support carries displaceable gripping jaws and is pivotally mounted on an axle at a distance from the jaws.

A space saving design, which is easy to install anywhere results in that the jaws of the gripper are mounted on mutually displaceable rack rods which mesh with a pinion common to both, and driven by a driving device which has a longitudinally displaceable driving member. Centering of each workpiece to the center of the spindle is obtained in an advantageous manner in that an adjustable stop member, substantially at right angles to the jaws of the gripping device, is provided.

The invention also provides that the distance between the jaws of the gripper can be suited to the diameter of each workpiece, by mutual adjustment of two parts. In this way spans of different sizes can be bridged and the device can be used with varying diameters of the workpieces. Further advantageous features of the invention will appear from the description of the embodiments of the invention with reference to the accompanying drawings, wherein two gripper devices are shown schematically, by way of example only, and in which:

FIG. 1 shows a top plan view on a single spindle automatic lathe having a device for the feeding of rod-shaped workpieces;

FIG. 2 is a portion of FIG. 1 on a larger scale with parts sectioned;

A feed device B engaging rod-shaped workpieces 43 to be machined, is arranged so to feed the workpieces to the machining position of a single spindle automatic lathe A of known design. The feed device has two longitudinal carriers 1, resting on supports, which are connected to one another by means of bearing blocks. A magazine 4 is mounted on the carriers. The magazine serves to store the rod-shaped work pieces 43.

Figure 3:
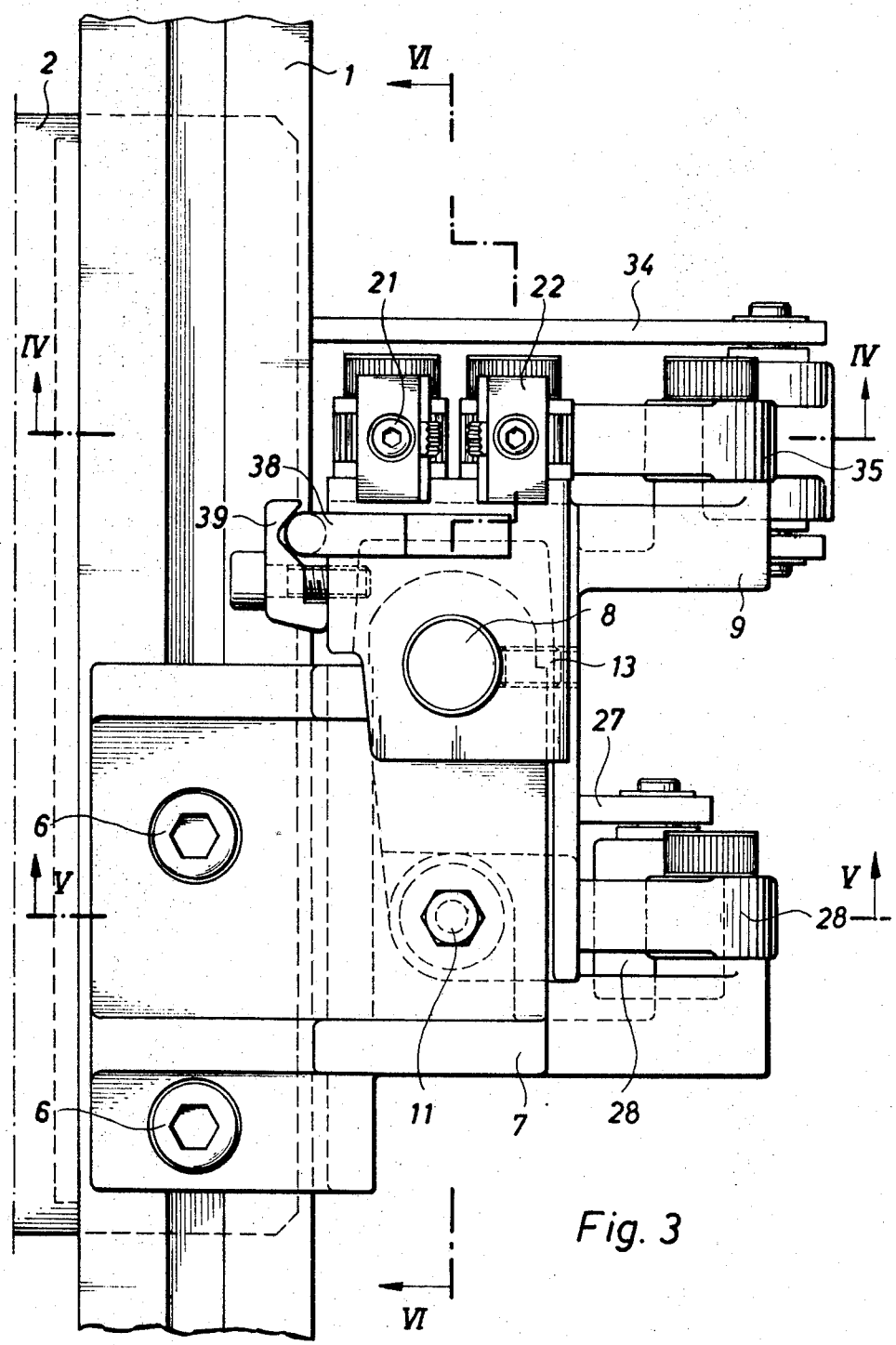
FIG. 3 shows a top plan view on a still larger scale of the embodiment shown in FIG. 2.

A gripping device pivotally mounted about an axis parallel to and displaced from the axis of the workpiece comprises a guide member 7 of U-shape cross section, having a sliding member 8 displaceably mounted therein (FIGS. 3, 5 and 6), such member being secured to the carrier 1 by means of a screw 6. The sliding member 8 is secured on a carriage 9, to which carriage there is secured a stop peg 10 spatially and parallelly disposed to the sliding member 8, such peg projecting from the carriage through the guide member 7, and cooperating with a resilient stop member 12, adjustable by means of a screw 11.

Figure 4:
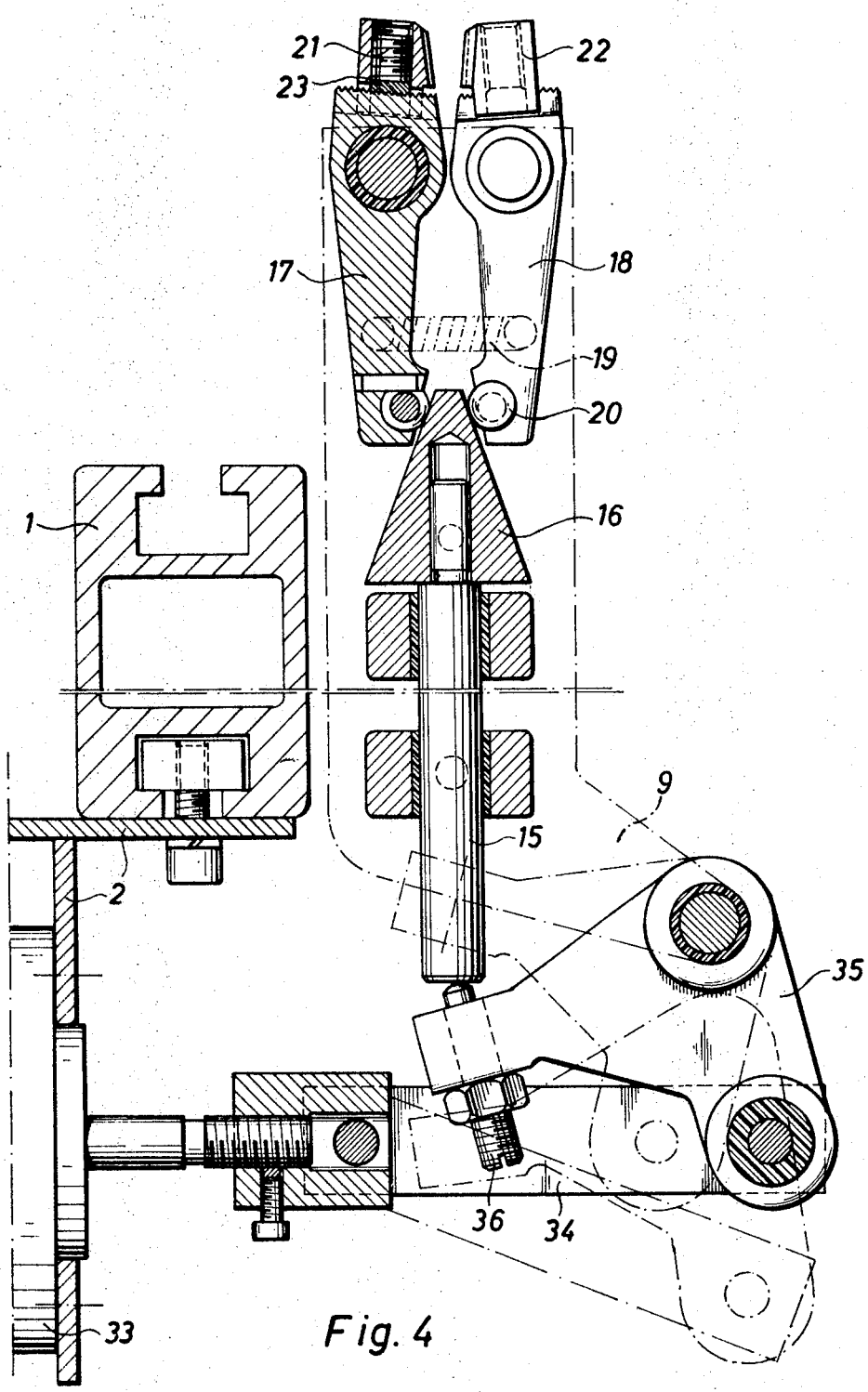
FIGS. 4 to 6 are in each case a section along the lines IV–IV, V–V, and VI–VI in FIG. 3.
Figure 6:
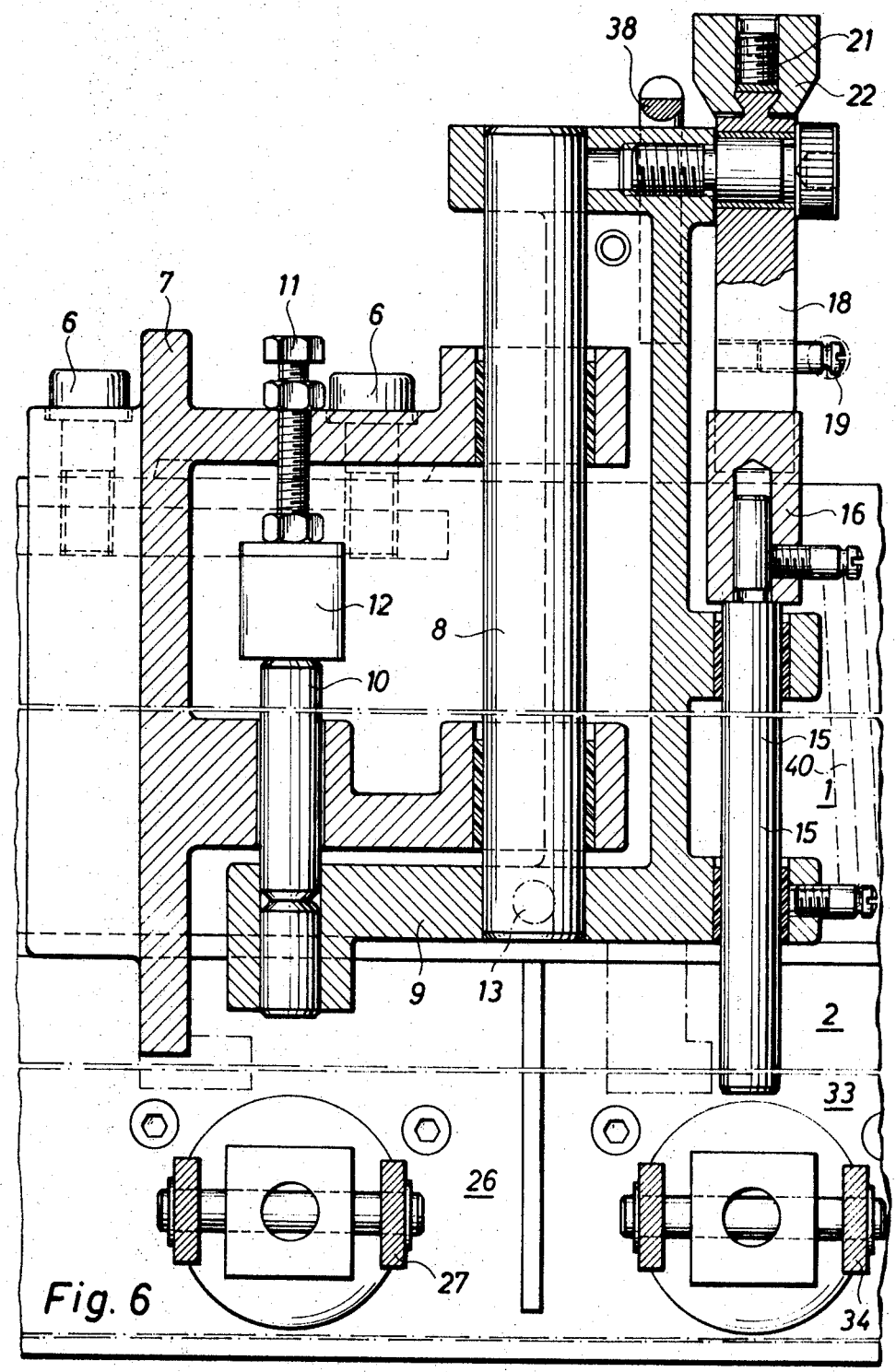
Figure 7:
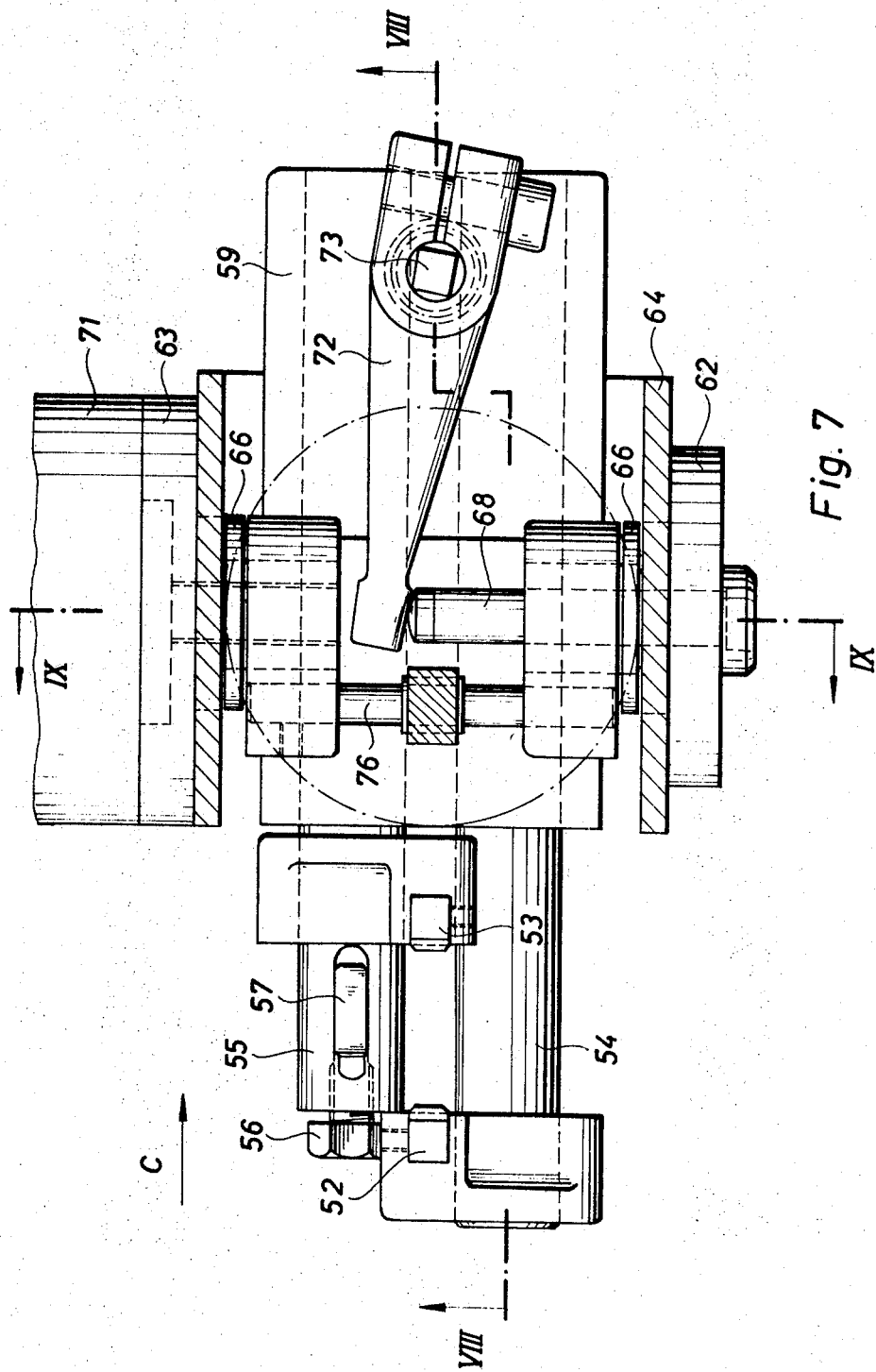
FIG. 7 shows the second embodiment in section along the line VII–VII in FIG. 8.

An operating rod 15, slidably mounted for longitudinal displacement in the carriage 9, has arranged on its upper end a spreading wedge 16, serving to operate a pair of levers 17 and 18 of a gripping device (FIG. 4). A spring 19 tensioned between the levers 17 and 18, urges engagement of the levers, which are supported by means of rollers 20 on the spreading wedge 16. The levers 17 and 18 mounted on the carriage each carry on the end remote from the spreading wedge 16 a gripping jaw 22 secured thereon by means of a screw 21. The jaw 22 is guided by means of a dovetail guide (FIG. 6). A brass body 23, is disposed between the screw 21 and the jaw, and adapts itself to the form of the rills disposed on the upper end of the levers 17 and 18 such an arrangement serving as a safety bearing.

Figure 5:
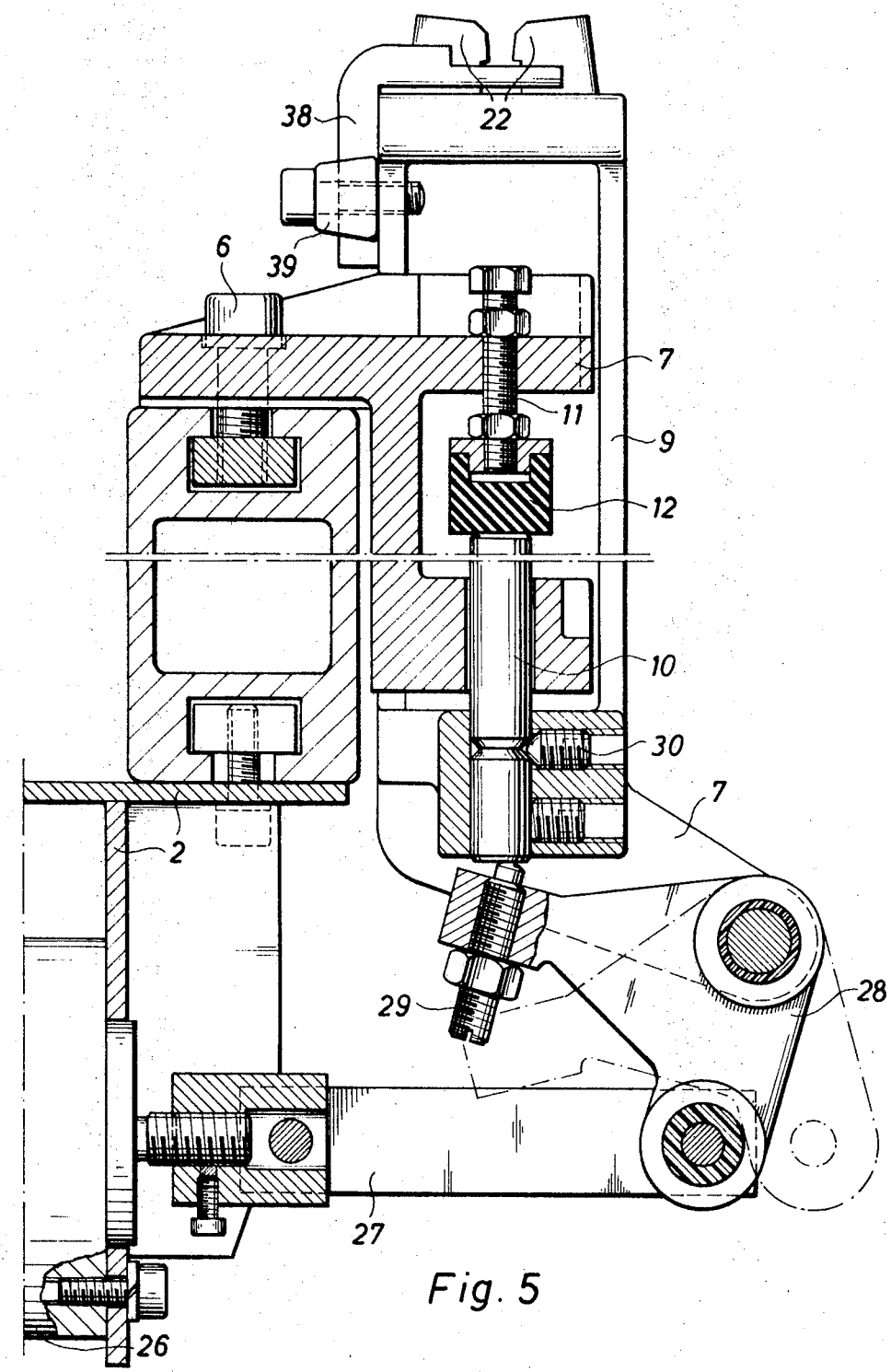

A solenoid 26, provided to raise and lower the carriage 9, is affixed by means of a support piece 2 below the carrier 1, and whose displaceable armature is articularly coupled by means of links 27 to an angled lever 28 mounted on the guide member 7 (FIG. 5). The angled lever 28, shown in two different positions carries on the end disposed above the link 27, an adjustment screw 29 which cooperates with the lower end of the stop peg 10 which is prevented from sliding in the carriage 9 by means of a screw 30 engaged in a groove in the peg.

A solenoid 33, arranged parallel and adjacent to the solenoid 26, is articularly coupled by means of a link 34 connecting its armature to an angled lever 35, which angled lever is pivotally mounted on the carriage 9, and carries on its free end, lying below the operating rod 15, and an adjusting screw 36, such screw engaging the lower side of the rod 15 (FIG. 4). The angled lever 35 is shown in three different positions. A support member 38 is arranged in the area of the jaws 22 and can be vertically adjusted by means of a clamping device 39. A draw spring 40 urges the operating rod 15 downwardly.

As shown in FIG. 2 a guide pipe 42, and a feed member 44 having a feed clamp 45 rotatable thereon, are provided adjacent the magazine 4 and in axial alignment with the workpiece 43.

To lay the workpiece 43 in its machining position, first of all the solenoid 26 is operated which raises the carriage 9 by means of the links 27 and the angled lever 18, thereby moving the jaws 22, such that the axis of the workpiece 43, lies between the jaws. The magnet 33 is subsequently operated which raises the operating rod 15 and moves the jaws 22 towards each other, in the direction of the workpiece 43, by spreading the bottom ends of the levers 17 and 18 by means of the spreading wedge 16, thereby engaging the workpiece between the jaws 22. The feed clamp 45 is pushed on to the workpiece by means of the feed member.

Subsequently by deenergizing the solenoid 33, its armature and thereby the operating rod 15, is returned to its initial position under the action of the draw spring 40, whereby the levers 17 and 18 are urged to approach one another by means of the spring 19, thereby opening the jaws 22.

The carriage 7 is lowered by deenergizing the solenoid 26. By this the jaws 22 move away from the path of displacement of the feed member 44, and feed clamp 45, which has a greater diameter than the rod-shaped workpiece 43.

After the rod-shaped workpiece 43 has been machined, the latter is brought by means of the feed clamp 45 and feed member in to the area of operation of the jaws 22, which firmly grip the machined workpiece in the manner described previously whereby this can be removed from the feed clamp 45 by means of the feed member 44. It is also possible to remove a workpiece instead of a machined workpiece from the feed device.

By opening of the jaws 22 the machined workpiece or the workpiece can release themselves therefrom, and on movement of the open jaws 22 downwardly into their initial position, the hitting of the carriage 9 on the guide member 7 causes the workpiece to be thrown out of the jaws.

In the second embodiment shown in FIGS. 7 to 10 jaws 52 and 53 of the gripping device, are respectively secured on rack rods 54 and 55. The rack rod 55 carries a support member 57, adjustable by means of a screw 56 to support a rod-shaped workpiece 58 lying between the jaws 52 and 53.

The two rack rods 54 and 55 are mounted to move longitudinally in a gearing member 59 pivotal about an axis parallel to the axis of the workpiece.

Figure 9:
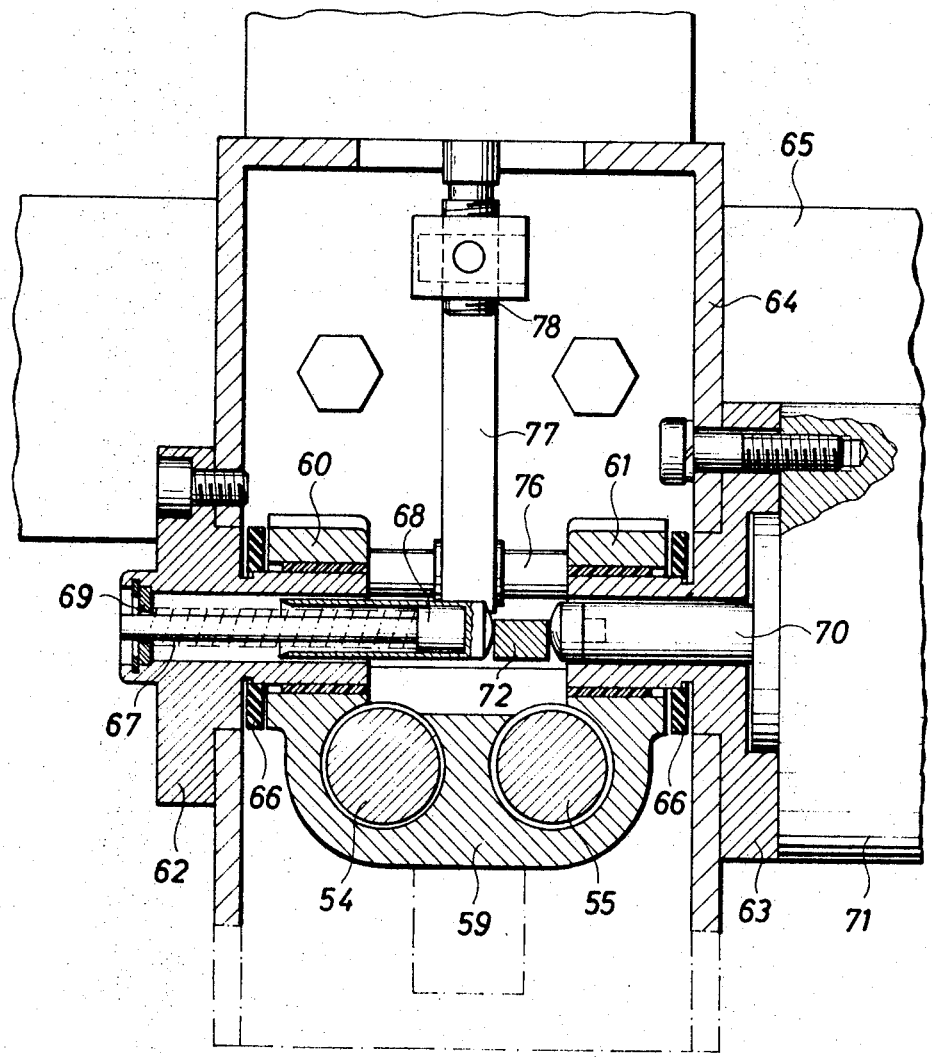
Figure 10:
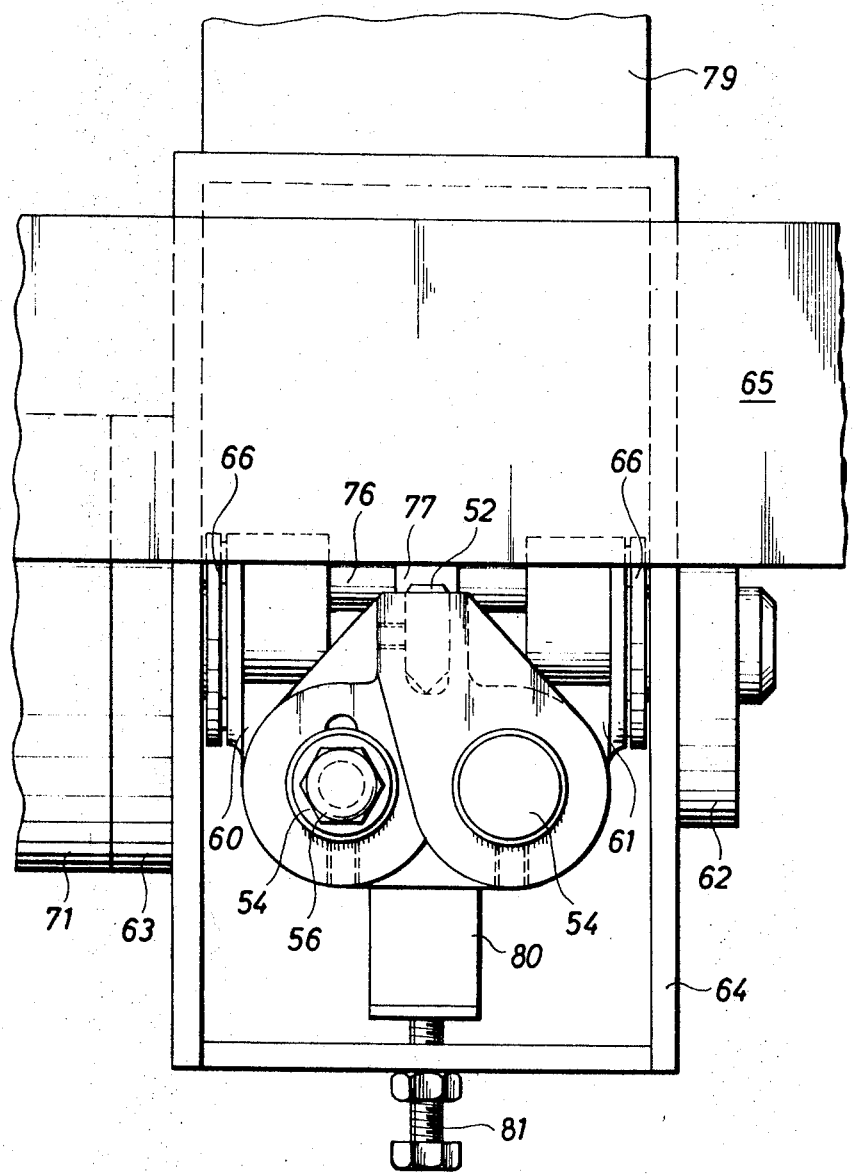
FIG. 10 is a view in the direction of the arrow C in FIG. 7.

The bearing member 59 has two bearing eyes 60 and 61 through which pass peg members 62 and 63 respectively (FIG. 9). Both peg members 62 and 63 are secured in a casing part 64 which is mounted on one of two magazine carriers 65.

Resilient washers 66 are arranged between the bearing eyes 60 and 61 and the peg members 62 and 63.

A spring bolt 68 is mounted to move longitudinally in the peg member 62, against a spring 67, the spring supporting itself between a head part of the bolt 68 and a support disc 69 held by a spring ring in the peg member 62.

Passing through the peg member 63 is an armature 70 of a solenoid 71, which, together with the member 63 is secured on the casing part 64.

A pivotal lever 72 is located between the spring bolt 68 and the armature 70, and is firmly clamped on a shaft 73 of a pinion 74. The pinion 74 engages the rack rods 54 and 55. The distance between the two jaws 52 and 53 can be adjusted by alteration of the rotational position of the pivotal lever 72 to the shaft 73.

A displacement rod 77 eccentric to the pivotal axis of the bearing member 59 engages at the bearing eyes 60 and 61 by means of a transverse rod 76. The displacement rod 77 is connected to an armature 78 of a solenoid 79 which is secured on the casing part 64. A resilient stop member 80, adjustable by means of an adjustment screw 81 is mounted at the under side of the casing part.

Figure 8:
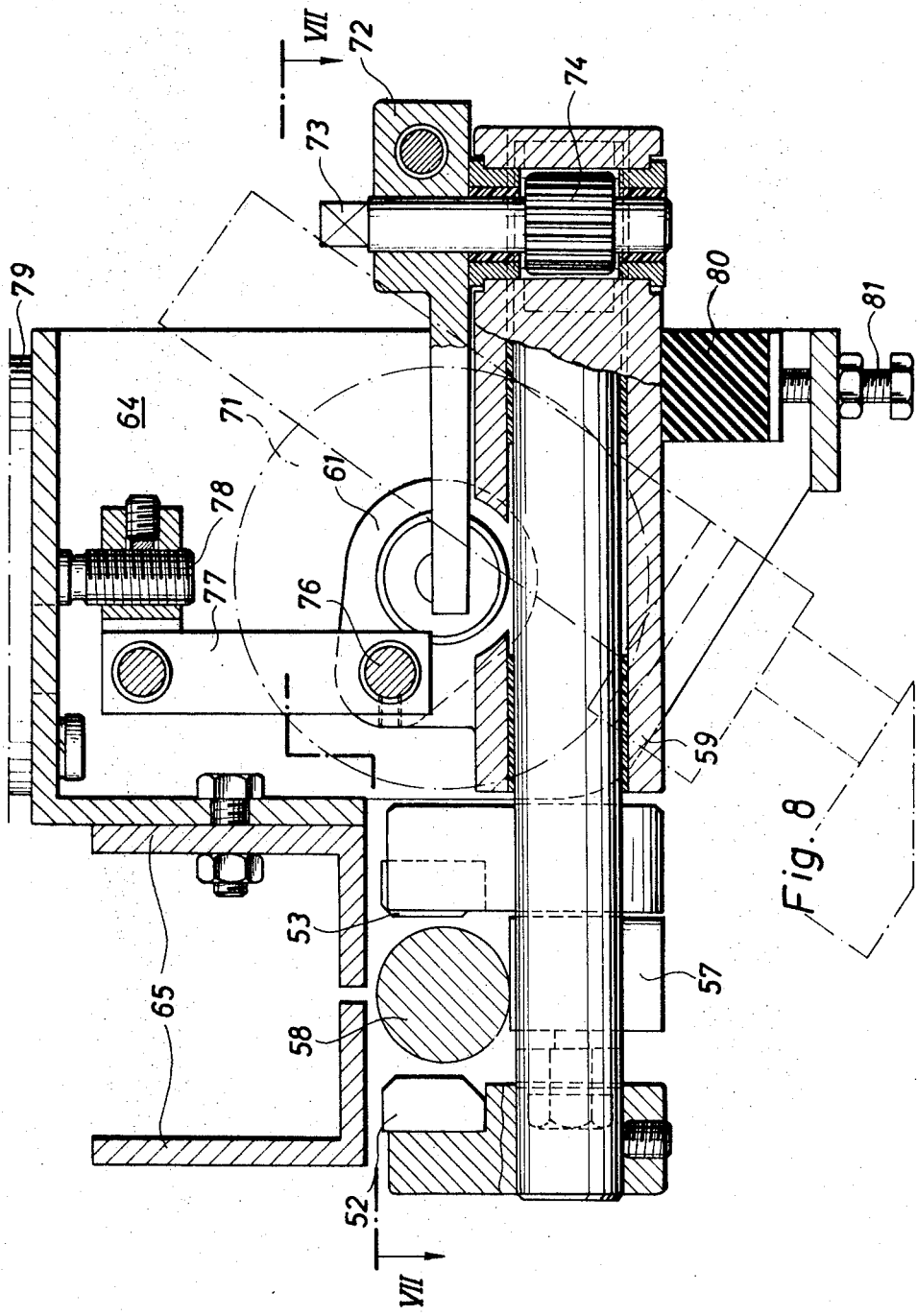
FIGS. 8 and 9 are sections along lines VIII–VIII and IX–IX in FIG. 7.

The solenoid 79 holds the bearing member 59 in the horizontal position shown in FIG. 8. As soon as the solenoid 79 is deenergized the bearing member 59 pivots under its own weight into the position shown in chain dotted line whereby a machined piece or a workpiece 58 is laid or thrown out onto a roll down slide lying therebeneath and not shown. On excitation of the solenoid 79 the bearing body 59 is brought back into its horizontal position.

Referring to FIG. 9, excitation of the solenoid 71 cause a movement of the armature 70 to the left, thereby rotating the pivotal lever 72, and causing the jaws 52, 53 to close and firmly clamp the rod-shaped workpiece 58, located between them, for the purpose previously described. As soon as the magnet 71 is deenergized the spring 67 returns the pivotal lever 72 and thereby the jaws 52 and 53 to their original position.

In both embodiments a stop member is provided for throwing out the workpiece or machined piece, lying between the jaws, adjacent the area of pivoting.

What I claim is:

1. A workpiece feeding device for machine tools, comprising in combination an undercarriage, a displaceable feed means for feeding a workpiece, said feed means including a feed clamp for holding the workpiece, said feed clamp having a longitudinal axis and being rotatable therearound, a framework, a carrier movably mounted on the framework, gripping means mounted on sad carrier and first driving means mounted on the undercarriage for moving the carrier between a first position wherein the gripping means lies in said path of displacement of said feed means and a second position wherein the gripping means lies out of said path of displacement of said feed means.

2. The device of claim 1, and further comprising means for operating said gripping means, including a displaceable operating rod, a wedge-shaped member having two inclined faces located at one end of the rod, a first operating lever engageable against one face of the wedge-shaped member and a second operating lever engageable against the other face of the wedge-shaped member, and second driving means mounted on the undercarriage for displacing said rod thereby moving said first and second levers.

3. The device of claim 2, wherein said gripping means comprises first and second jaws adjustably coupled to the first and second operating levers respectively whereby movement of said operating levers causes said jaws to open or close.

4. The device of claim 3, wherein said first and second driving means are located adjacent each other on said undercarriage and act in parallel directions, there being also provided a first angled lever through which the first driving means acts on the carrier and a second angled lever mounted on the carrier, said second angled lever being coupled to the second driving means by a pivotable lever and being engageable against said operating rod on operation of said second driving means.

5. The device of claim 4, wherein a stop member is provided substantially parallel to the line of action of the jaws for supporting a workpiece.

6. The device of claim 5, and comprising two mutually displaceable rack rods, a jaw being mounted on each rack rod, a pinion common to both rack rods, and second driving means for driving said pinion to displace said rack rods and thereby open or close said jaws.

7. The device of claim 6, a shaft on which said pinion is mounted, a driving lever adjustably mounted on the shaft and movable by the second driving means, whereby adjustment of the driving lever on the shaft varies the distance between the jaws in their closed position.

8. The device of claim 7, wherein a stop member is provided substantially parallel to the line of action of the jaws for supporting a workpiece.

9. The device of claim 8, wherein said first and second driving means are electrically operable.

10. The device of claim 1, wherein the gripping means comprises movable jaws carried by said carrier, said carrier being pivotably mounted on the framework on an axis remote from the jaws.